Patented June 24, 1930

1,767,377

UNITED STATES PATENT OFFICE

GEORG KRÄNZLEIN, HEINRICH GREUNE, AND HEINRICH VOLLMANN, OF HOCHST-ON-THE-MAIN, GERMANY, ASSIGNORS TO GENERAL ANILINE WORKS, INC., OF NEW YORK, N. Y., A CORPORATION OF DELAWARE

YELLOWISH VAT DYESTUFFS

No Drawing. Original application filed February 6, 1925, Serial No. 7,390, and in Germany February 16, 1924. Divided and this application filed November 27, 1925. Serial No. 71,708.

In German Patents Nos. 365,902 and 368,168 to 368,172 there are described condensation products which are obtainable by subjecting para-hydroxyphenazines or naphthosultam-3.4-phenazines to reaction with 2-chloro-1.4-quinones or their substitution products or with mono-or dichloro-4-naphthosultamquinone.

We have now found that the compounds of the general formula:

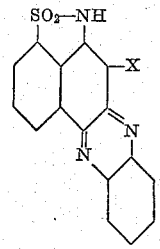

wherein X stands for a substituent of the group consisting of hydrogen and halogen, are capable of reacting in the presence of an organic solvent with a 1.4-quinone which is substituted in the 2 and 3 positions by hydrogen, and that the condensation products thus obtainable can be converted into valuable dyestuffs by a subsequent treatment with an alkaline oxidizing agent.

The following examples illustrate our invention, the parts being by weight:

(1) By heating 34 parts of 2-chlornaphthosultam-3.4-phenazine with 17 parts of 1.4-naphthoquinone in 400 parts of nitrobenzene a product is obtained in the form of darkbrown crystalline needles. This product dyes from the vat wool and cotton yellowish-brown tints. If the condensation product, before being dyed on the material, is subjected to an alkaline oxidation, for instance treated with hypochlorite solution, it dyes from the vat bright yellow tints with a greenish hue. It is a striking fact that 2-chlornaphthosultam-3.4-phenazine does not undergo any reaction with 2.3-dichlornaphthoquinone not even when the methods indicated in the said German patents are employed (addition of metallic copper and anhydrous sodium acetate).

The reactions above described may be represented graphically as follows:

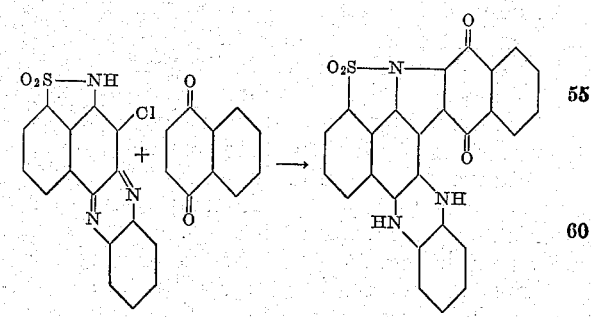

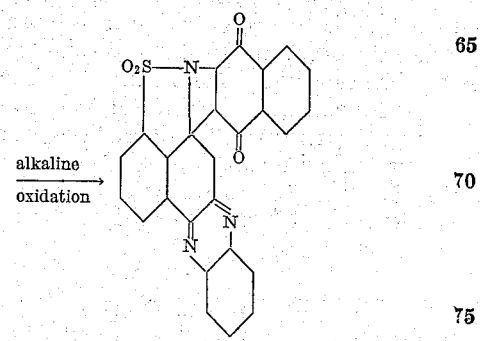

(2) 30 parts of naphthosultam-3.4-phenazine of the most probable formula:

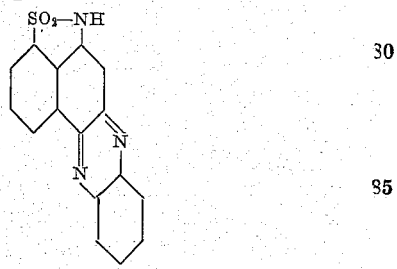

and 11 parts of benzoquinone are heated to boiling in nitrobenzene for 15 minutes. The condensation product which separates constitutes a body crystallizing in reddish-brown prisms, which dyes from an olive vat, after exposure to air, khakicolored tints. By treating the said condensation product with hypochlorite solution a yellow dye-paste is obtained which is most suitable for the preparation of color-lakes.

(3) 60 parts of naphthosultam-3.4-phenazine, 36 parts of β-hydroxynaphthoquinone, 30 parts of acetic anhydride and 300 parts of nitrobenzene are heated to boiling until the formation of the dyestuff is complete. After cooling the product is washed with alcohol and the condensation product, if required, subjected to an after-treatment with an alkaline oxidizing agent.

This application is a division of our application Serial Number 7,390, filed February 6th, 1925.

We claim:

1. The process which comprises heating 2-chloro-naphthosultam-3.4-phenazine with a 1.4-quinone which is substituted in the 2 and 3 positions by hydrogen, in the presence of an organic solvent and treating the condensation product with an alkaline oxidizing agent.

2. The process which comprises heating 2-chloro-naphthosultam-3.4-phenazine with a 1.4-quinone which is substituted in the 2 and 3 positions by hydrogen, in the presence of nitrobenzene and treating the condensation product with an alkaline oxidizing agent.

3. The process which comprises heating 2-chloro-naphthosultam-3.4-phenazine with 1.4-naphthoquinone, in the presence of nitrobenzene and treating the condensation product with an alkaline oxidizing agent.

4. The process which comprises heating 2-chloro-naphthosultam-3.4-phenazine with 1.4-naphthoquinone, in the presence of nitrobenzene at a temperture of 160° C. to 170° C. and treating the condensation product with hypochlorite solution.

5. The process which comprises heating a compound of the general formula:

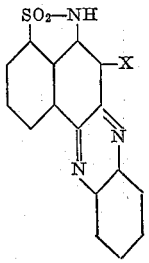

wherein X stands for a substituent of the group consisting of hydrogen and halogen, with a 1.4-quinone which is substituted in the 2 and 3 positions by hydrogen, in the presence of an organic solvent and treating the condensation product with an alkaline oxidizing agent.

6. The process which comprises heating a compound of the general formula:

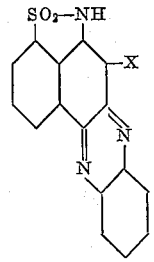

wherein X stands for a substituent of the group consisting of hydrogen and halogen, with a 1.4-quinone which is substituted in the 2 and 3 positions by hydrogen, in the presence of nitrobenzene and treating the condensation product with an alkaline oxidizing agent.

In testimony whereof, we affix our signatures.

GEORG KRÄNZLEIN.
HEINRICH GREUNE.
HEINRICH VOLLMANN.